US012731246B2

United States Patent
(12) United States Patent
Miyamoto et al.

(10) Patent No.: US 12,731,246 B2
(45) Date of Patent: Sep. 8, 2026

(54) ABNORMALITY DETERMINATION COMPUTER AND ABNORMALITY DETERMINATION METHOD

(71) Applicant: Hitachi, Ltd., Tokyo (JP)

(72) Inventors: Atsushi Miyamoto, Tokyo (JP); Hiromi Nishiura, Tokyo (JP); Naoaki Kondo, Tokyo (JP); Akira Ito, Tokyo (JP)

(73) Assignee: Hitachi, Ltd., Tokyo (JP)

(*) Notice: Subject to any disclaimer, the term of this patent is extended or adjusted under 35 U.S.C. 154(b) by 297 days.

(21) Appl. No.: 18/566,781

(22) PCT Filed: Jun. 2, 2022

(86) PCT No.: PCT/JP2022/022483
§ 371 (c)(1),
(2) Date: Dec. 4, 2023

(87) PCT Pub. No.: WO2022/264824
PCT Pub. Date: Dec. 22, 2022

(65) Prior Publication Data

US 2024/0273708 A1 Aug. 15, 2024

(30) Foreign Application Priority Data

Jun. 16, 2021 (JP) ................................ 2021-100513

(51) Int. Cl.
*G06T 7/00* (2017.01)

(52) U.S. Cl.
CPC .... *G06T 7/001* (2013.01); *G06T 2207/20081* (2013.01); *G06T 2207/20084* (2013.01)

(58) Field of Classification Search
CPC ........... G06T 7/001; G06T 2207/20081; G06T 2207/20084; G06T 7/0004
See application file for complete search history.

(56) References Cited

U.S. PATENT DOCUMENTS 11,809,520 B1 * 11/2023 D'Innocente .......... G06N 3/045
2020/0311895 A1 10/2020 Sakurai et al.
(Continued)

FOREIGN PATENT DOCUMENTS

CN 110992354 A 4/2020
JP 2020-160616 A 10/2020
(Continued)

OTHER PUBLICATIONS

Yu J, Xu Y, Yu G, Liu L. Fault severity identification of roller bearings using flow graph and non-naive Bayesian inference. Proceedings of the Institution of Mechanical Engineers, Part C: Journal of Mechanical Engineering Science. 2019;233(14):5161-5171. doi: 10.1177/0954406219834966 (Year: 2019).*
(Continued)

*Primary Examiner* — Andrew M Moyer
*Assistant Examiner* — Conor A O'Malley
(74) *Attorney, Agent, or Firm* — Volpe Keonig

(57) ABSTRACT

In anomaly determination using an autoencoder, the present invention enables highly accurate anomaly determination with respect to an unknown anomaly image, even in the case of learning using only a non-defective image. In a learning step of learning a parameter of the autoencoder using a non-defective learning image /{f_i/} captured of a non-defective test target, an anomaly determination accuracy rate Rc of the non-defective learning image /{f_i/} is used as an evaluation value, and a dimension compression rate Rd of a code layer of the autoencoder is maximized or an input signal amount to the code layer or an output signal amount from the code layer is decreased, such that the anomaly determination accuracy rate Rc is maximized or becomes at least a predetermined threshold th.

16 Claims, 10 Drawing Sheets

(a) NO-DEFECTS LEARNING IMAGE: f (b) PSEUDO ABNORMAL IMAGE: f' (FOREIGN MATTER)

(c) PSEUDO ABNORMAL IMAGE: f' (DEFECTIVE)

(d) PSEUDO ABNORMAL IMAGE: f' (SCRATCH)

(e) PSEUDO ABNORMAL IMAGE: f' (SURFACE UNEVENNESS)

(f) PSEUDO ABNORMAL IMAGE: f' (SHAPE DEFORMATION)

(56) References Cited

U.S. PATENT DOCUMENTS

| | | | | |
|---|---|---|---|---|
| 2020/0364905 | A1* | 11/2020 | Shimodaira | G06N 3/0464 |
| 2021/0295485 | A1 | 9/2021 | Miyazawa et al. | |
| 2021/0303867 | A1* | 9/2021 | Vaughan | G06V 10/25 |
| 2022/0262019 | A1* | 8/2022 | Watanabe | G06T 7/0004 |
| 2023/0298327 | A1* | 9/2023 | Katayama | G06V 10/774 382/145 |

FOREIGN PATENT DOCUMENTS

| | | | | |
|---|---|---|---|---|
| WO | 2018/105028 | A1 | 6/2018 | |
| WO | WO-2021049005 | A1 * | 3/2021 | G06N 3/045 |

OTHER PUBLICATIONS

Geoffrey E. Hinton and R. R. Salakhutdinov, "Reducing the Dimensionality of Data with Neural Networks," Science, 313 (5786), pp. 504-507 (2006).

International Search Report dated Aug. 16, 2022 for PCT International Application No. PCT/JP2022/022483.

* cited by examiner

LEARNING PHASE (NO-DEFECTS LEARNING)
200
INPUT IMAGE: f_i
202
ENCODER
205
207
208
CODE LAYER
g_i
209
DECODER
206
210
211
OUTPUT IMAGE: h_i
212
INSPECTION PHASE (ABNORMALITY DETERMINATION)
201
INSPECTION IMAGE: f''_i
203
204
ESTIMATED NO-DEFECTS IMAGE: h''_i
213

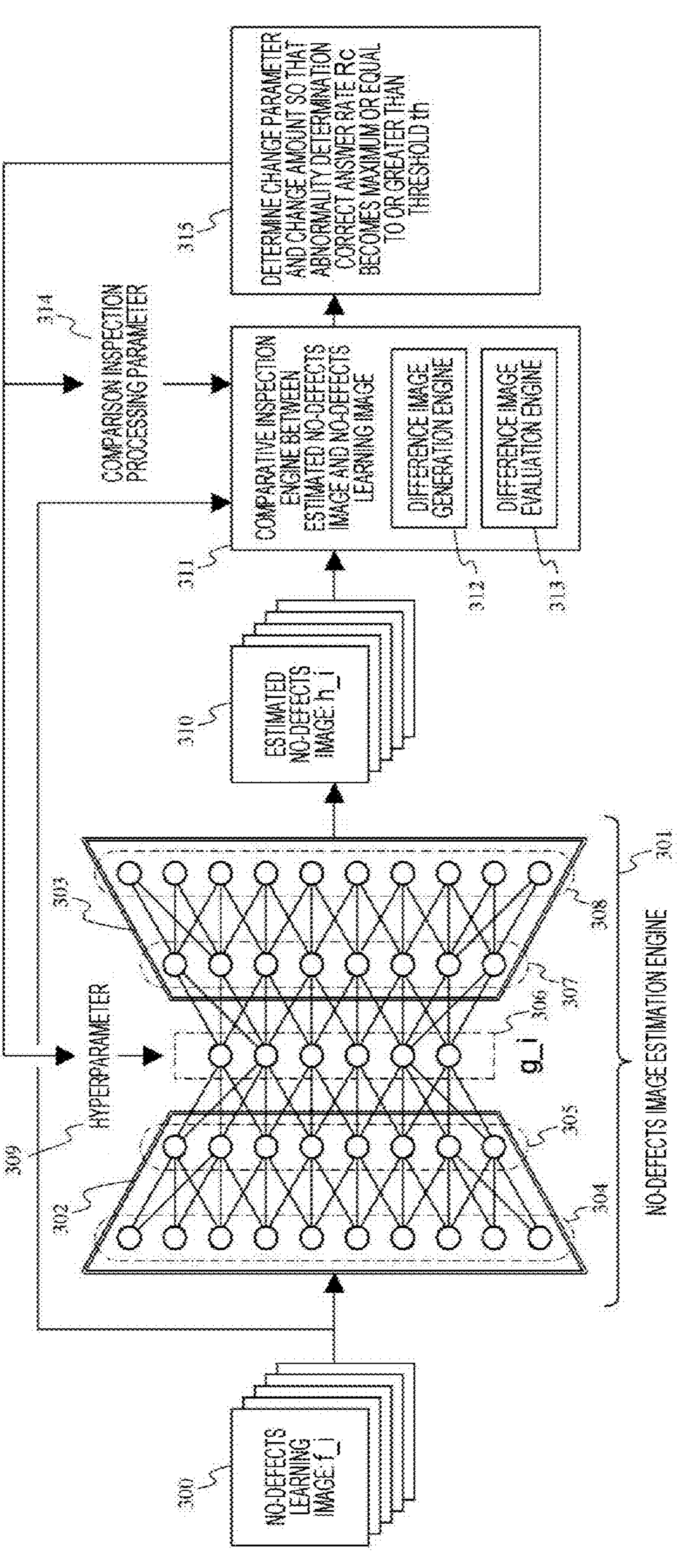
FIG. 3
300
NO-DEFECTS LEARNING IMAGE f_i
309
HYPERPARAMETER
302
304
305
g_i
306
307
303
308
301
NO-DEFECTS IMAGE ESTIMATION ENGINE
310
ESTIMATED NO-DEFECTS IMAGE h_i
311
COMPARATIVE INSPECTION ENGINE BETWEEN ESTIMATED NO-DEFECTS IMAGE AND NO-DEFECTS LEARNING IMAGE
312
DIFFERENCE IMAGE GENERATION ENGINE
313
DIFFERENCE IMAGE EVALUATION ENGINE
314
COMPARISON INSPECTION PROCESSING PARAMETER
315
DETERMINE CHANGE PARAMETER AND CHANGE AMOUNT SO THAT ABNORMALITY DETERMINATION CORRECT ANSWER RATE Rc BECOMES MAXIMUM OR EQUAL TO OR GREATER THAN THRESHOLD th

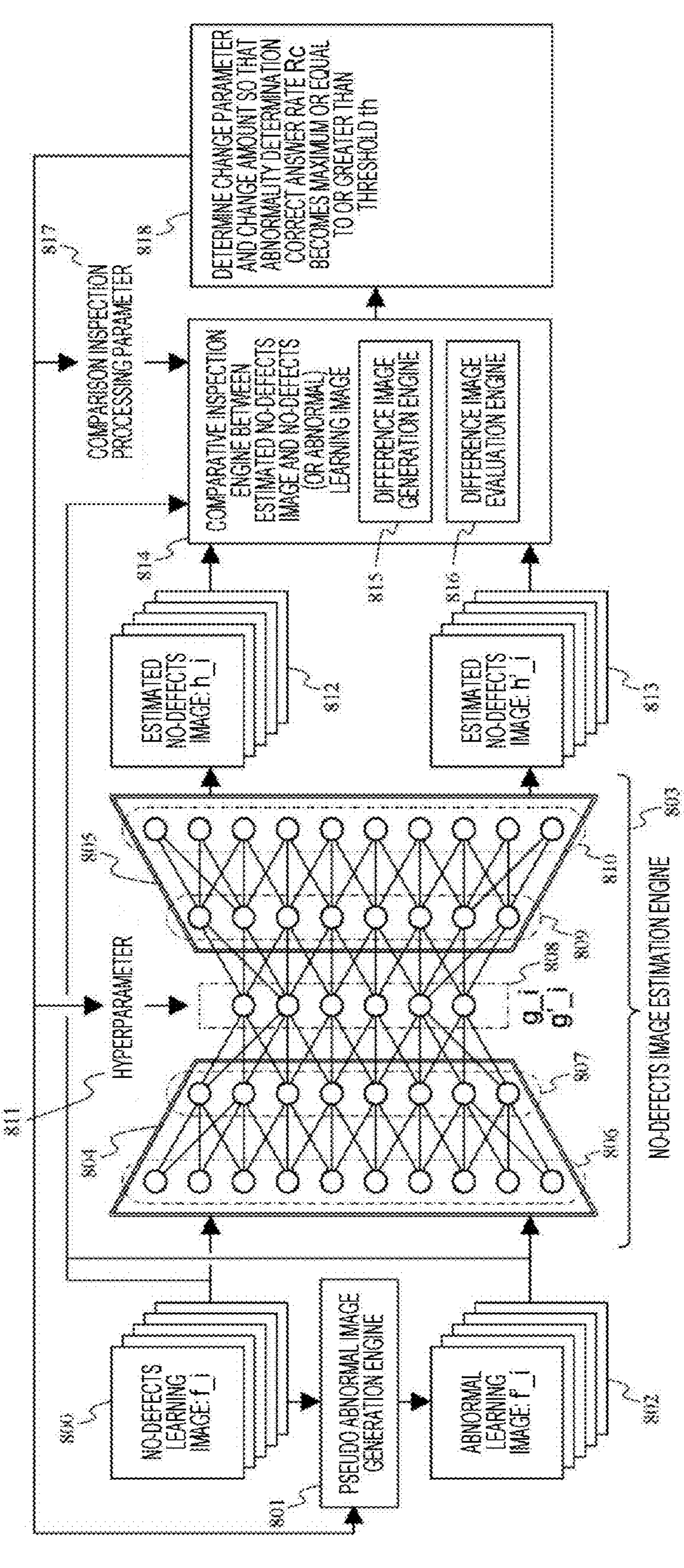
FIG. 8
NO-DEFECTS LEARNING IMAGE: f_i
800
PSEUDO ABNORMAL IMAGE GENERATION ENGINE
801
ABNORMAL LEARNING IMAGE: f'_i
802
NO-DEFECTS IMAGE ESTIMATION ENGINE
803
804
805
806
807
808
809
810
HYPERPARAMETER
811
g_i
g'_i
ESTIMATED NO-DEFECTS IMAGE: h_i
812
ESTIMATED NO-DEFECTS IMAGE: h'_i
813
COMPARATIVE INSPECTION ENGINE BETWEEN ESTIMATED NO-DEFECTS IMAGE AND NO-DEFECTS (OR ABNORMAL) LEARNING IMAGE
814
DIFFERENCE IMAGE GENERATION ENGINE
815
DIFFERENCE IMAGE EVALUATION ENGINE
816
COMPARISON INSPECTION PROCESSING PARAMETER
817
DETERMINE CHANGE PARAMETER AND CHANGE AMOUNT SO THAT ABNORMALITY DETERMINATION CORRECT ANSWER RATE Rc BECOMES MAXIMUM OR EQUAL TO OR GREATER THAN THRESHOLD th
818

(a) NO-DEFECTS LEARNING IMAGE: f
(b) PSEUDO ABNORMAL IMAGE: f' (FOREIGN MATTER)
(c) PSEUDO ABNORMAL IMAGE: f' (DEFECTIVE)
(d) PSEUDO ABNORMAL IMAGE: f' (SCRATCH)
(e) PSEUDO ABNORMAL IMAGE: f' (SURFACE UNEVENNESS)
(f) PSEUDO ABNORMAL IMAGE: f' (SHAPE DEFORMATION)

ABNORMALITY DETERMINATION COMPUTER AND ABNORMALITY DETERMINATION METHOD

TECHNICAL FIELD

The present invention relates to an abnormality determination computer and an abnormality determination method.

BACKGROUND ART

The present invention relates to an abnormality determination computer and an abnormality determination method preferably based on machine learning. A computer and a method for inputting an inspection image acquired by imaging an inspection target object to an autoencoder, estimating a no-defects image corresponding to the inspection image, and automatically determining whether the inspection target object is no-defects or abnormal by comparing the inspection image with an estimated no-defects image are provided.

For many industrial products including machines, metals, chemicals, foods, and fibers, appearance inspection for evaluating various types of workmanship such as shape defects, assembly defects, adhesion of foreign matters, internal defectives and fatalities, surface scratches and unevenness, and dirt based on inspection images is widely performed. In general, most of these appearance inspections have been performed by visual judgment of inspectors.

On the other hand, with an increase in demand for mass production and quality improvement, the inspection cost and the load on the inspectors are increasing. A sensory test based on human senses requires particularly high experience and skills. There is also a problem of the dependence on individual skills and reproducibility, where evaluation values vary depending on inspectors or results vary depending on inspections. There is a strong demand for automation of the inspection against such problems as cost, skill, and dependence on individual skills regarding inspections.

In recent years, a deep network model represented by a convolutional neural network (CNN) has been proposed, leading to dramatic improvement in the performance of machine learning, and proposal of many appearance inspection methods based on machine learning.

In abnormality determination of determining whether an inspection target object is no-defects or abnormal based on machine learning, it is ideal to collect a large number of no-defects images and abnormal images of the inspection target object in advance and learn a determination engine.

However, in manufacturing lines of industrial products, abnormalities rarely occur in general, and abnormality patterns are diverse. Therefore, it is very difficult to exhaustively collect many abnormal images in advance and use them for learning. Therefore, a method of performing learning (called no-defects learning) using only no-defects images using a neural network called an autoencoder and performing abnormality determination of inspection target objects has been disclosed (e.g., PTL 1).

The autoencoder is a network in which an input image is reduced (dimensionally compressed) by an encoder and then restored to an image having its original size by a decoder. By learning the autoencoder so as to input the no-defects image and output the same no-defects image, when an abnormal image having an abnormality such as a defect is input, it is expected that a no-defects image (estimated no-defects image) having no abnormality is output. An abnormal portion can be detected by getting a difference between the inspection image and the estimated no-defects image.

CITATION LIST

Patent Literature

PTL 1: JP 2020-160616 A

SUMMARY OF INVENTION

Technical Problem

In the abnormality determination using the autoencoder represented by PTL 1 described above, there is a case where an appropriate estimated no-defects image cannot be estimated. This is because the learning of the autoencoder is performed so as to estimate a same no-defects image from a no-defects image, and when an unknown abnormal image that is not used for learning is input, a good estimated no-defects image, that is, an estimated no-defects image with the abnormal portion having been removed from the input abnormal image is not necessarily output. Variations of abnormality patterns occurring in actual manufacturing lines and the like are diverse, and it is difficult to learn all in advance in reality. Therefore, a mechanism for performing highly accurate abnormality determination even on an unknown abnormal image by learning using only a no-defects image is required.

The present invention has been made in view of the above problems, and provides an abnormality determination computer and an abnormality determination method that can perform highly accurate abnormality determination on an unknown abnormal image even in learning using only a no-defects image in abnormality determination using an autoencoder.

Solution to Problem

In order to solve the above problem, an abnormality determination computer according to one viewpoint of the present invention is an abnormality determination computer that determines an abnormality of an inspection target object, the abnormality determination computer, including: a processor, in which the processor executes a no-defects learning image acquisition step of acquiring a no-defects learning image $\{f_i\}$ (i=1, . . . , Nf, Nf: number of images) obtained by imaging the inspection target object of no-defects, a learning step of learning a parameter of an autoencoder using the no-defects learning image $\{f_i\}$, an inspection image acquisition step of acquiring an inspection image f" obtained by imaging the inspection target object, a no-defects image estimation step of inputting the inspection image f" to the autoencoder to estimate an estimated no-defects image h", and a determination step of performing abnormality determination by a comparative inspection engine from the inspection image f" and the estimated no-defects image h", and in the learning step, a dimensional compression rate Rd of a code layer of the autoencoder is maximized or an input signal amount to the code layer or an output signal amount from the code layer is reduced such that an abnormality determination correct answer rate Rc of the no-defects learning image $\{f_i\}$ becomes maximum or equal to or greater than a predetermined threshold th with the abnormality determination correct answer rate Rc as an evaluation value.

Advantageous Effects of Invention

According to the present invention, it is possible to achieve an abnormality determination computer and an abnormality determination method that can perform highly accurate abnormality determination on an unknown abnormal image even in learning using only a no-defects image in abnormality determination using an autoencoder.

BRIEF DESCRIPTION OF DRAWINGS

FIG. 3 is a view illustrating a learning method of an autoencoder and a comparative inspection engine in the automatic abnormality determination system according to Example 1.

FIG. 8 is a view illustrating a learning method of an autoencoder using an abnormal image in an automatic abnormality determination system according to Example 2.

DESCRIPTION OF EMBODIMENTS

Figure 1:
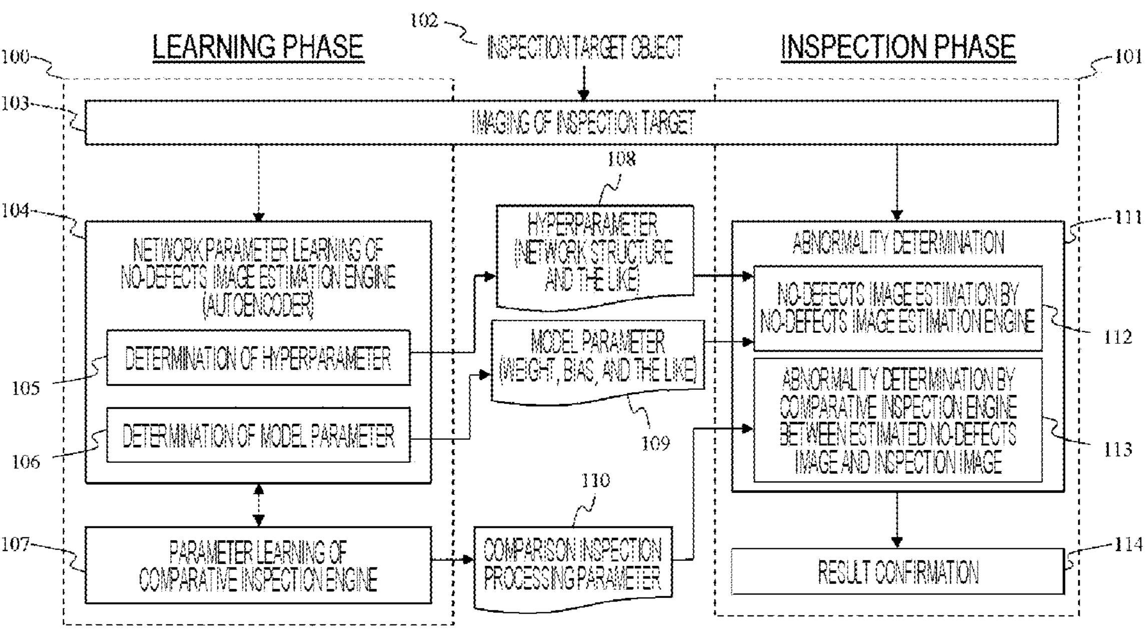
FIG. 1 is a view illustrating an automatic abnormality determination system and an entire processing sequence according to Example 1.

An embodiment of the present invention is hereinafter described with reference to the drawings. Note that the embodiment described below does not limit the invention according to the claims, and all the elements described in the embodiment and combinations thereof are not necessarily essential to the solution of the invention.

Note that in the drawings for describing examples, parts having the same functions are denoted by the same reference signs, and repeated description thereof will be omitted.

In the following description, an expression such as "xxx data" may be used as an example of information, but the data structure of information may be any structure. That is, in order to indicate that information does not depend on the data structure, "xxx data" can be called "xxx table". Furthermore, "xxx data" may be simply called "xxx". In the following description, the configuration of each piece of information is an example, and information may be divided and held, or may be combined and held.

Note that in the following description, processing may be described with a "program" as a subject. The subject of processing may be a program because when executed by a processor (e.g., a central processing unit (CPU)), the program performs predetermined processing appropriately using a storage resource (e.g., a memory) and/or a communication interface device (e.g., a port). The processing described with the program as the subject may be processing performed by a processor or a computer having the processor.

The abnormality determination computer and the abnormality determination method according to the present embodiment have the following configuration as an example.

(1) The no-defects learning image acquisition step of imaging an inspection target object of no-defects and acquiring the no-defects learning image {f_i} (i=1, . . . , Nf, Nf: number of images), the learning step of learning a parameter of the autoencoder using the no-defects learning image {f_i}, the inspection image acquisition step of imaging the inspection target object and acquiring the inspection image f", the no-defects image estimation step of inputting the inspection image f" to the autoencoder to estimate the estimated no-defects image h", and the determination step of performing abnormality determination by the comparative inspection engine from the inspection image f" and the estimated no-defects image h" are included, and in the learning step, the dimensional compression rate Rd of an encoded code layer is maximized or the input signal amount to the code layer or the output signal amount from the code layer is reduced such that the abnormality determination correct answer rate Rc of the no-defects learning image {f_i} becomes maximum or equal to or greater than the predetermined threshold th with the Rc as an evaluation value.

The present characteristic will be supplemented. An abnormality determination engine includes a "no-defects image estimation engine" that inputs an inspection image to the autoencoder to obtain an estimated no-defects image, and the "comparative inspection engine" that compares the inspection image with the estimated no-defects image to perform abnormality determination.

The comparative inspection engine may be a rule-based determination algorithm or a machine learning-based determination algorithm such as a neural network.

It is unclear what estimated no-defects image is output when an inspection image including an unlearned abnormality pattern is input to the autoencoder learned to estimate a no-defects image from a no-defects image. It is also unclear whether abnormality determination of an inspection image can be correctly performed based on the comparison inspection between the inspection image and the estimated no-defects image.

Examples of failing to output the estimated no-defects image include a case where the abnormal image input by the autoencoder can be restored. That is, even if the input image is an abnormal image, if the output image is also an abnormal image similar to the input image, the difference between the input image and the output image is small, and thus it is erroneously determined as no-defects. Therefore, the autoencoder should be learned so as to be able to restore only no-defects images and not to be able to restore other images.

One factor that the autoencoder can restore images other than the no-defects learning images learned by the autoencoder include the fact that expressive power of the autoencoder is too high. Therefore, in the present embodiment, the network structure is optimized so as to increase the dimensional compression rate Rd of the code layer as much as possible, and the expressive power of the autoencoder is reduced.

When the dimensional compression rate Rd is high, the input image is expressed by a small number of nodes (features) in the code layer, and thus the possibility that images other than the no-defects learning images learned by the autoencoder can be expressed can be reduced.

At that time, the dimensional compression rate Rd is maximized with the abnormality determination correct answer rate Rc as an evaluation value. Normally, the autoencoder is learned so that the no-defects learning image is restored with higher accuracy, but in the abnormality determination, it is not always necessary to obtain a highly accurate estimated no-defects image. That is, it is because even if the estimated no-defects image obtained by restoring a no-defects image is deteriorated, it is sufficient that correct abnormality determination can be performed in the comparative inspection engine. The abnormality determination correct answer rate Rc is used as the evaluation value when the expressive power of the autoencoder is determined, but as described above, the abnormality determination correct answer rate Rc may be determined to be maximum, or the abnormality determination correct answer rate Rc may be determined to be equal to or greater than the predetermined threshold th.

(2) Maximization of the dimensional compression rate Rd of the code layer in the learning step is performed by reducing a number of nodes included in each channel of the code layer or a number of channels.

The present characteristic will be supplemented. As described above, in the present embodiment, images other than no-defects images cannot be restored by reducing the expressive power of the autoencoder with the abnormality determination correct answer rate Rc as an evaluation value.

Methods of reducing the expressive power of the autoencoder include a method of maximizing the dimensional compression rate Rd of the code layer. Specifically, the number of nodes included in each channel of the code layer or the number of channels is reduced. Since the total number of nodes in the code layer can be regarded as the number of features after dimension reduction by the encoder, the reduction of the total number of nodes increases the dimensional compression rate Rd.

(3) In the learning step, reduction of the input signal amount to the code layer is performed by setting, among weights $w\_ij$ of a j-th input signal $\{x\_ij\}$ ($i=1, \ldots, Nn$, Nn: number of nodes of code layer, $j=1, \ldots, Nx\_i$, $Nx_i$: number of input signals to i-th node of code layer) to an i-th node of the code layer, a value of a weight $\{w\_ij|(i, j) \bigstar \Phi\}$ (Φ: set of numbers (i, j) of weights $w\_ij$ for setting the value to zero) for at least one or more nodes to zero or a value close to zero, and the set Φ is a set ($\{\Phi=\{(i, j)\}|x\_ij \leq x\_min\}$) of numbers (i, j) in which the input signal $\{x\_ij\}$ becomes equal to or less than a certain value $x\_min$ when the no-defects learning image $\{f_i\}$ is input to the autoencoder.

The present characteristic will be supplemented. As a method of reducing the expressive power of the autoencoder with the abnormality determination correct answer rate Rc as the evaluation value, a method of decreasing the values of some input signals to nodes included in the code layer may be adopted. That is, in order to reduce the expressive power of the autoencoder, a direct method of reducing the number of nodes as described above may be adopted. However, not by choosing whether to leave or delete a certain node but by reducing the value of the input signal to the node, it is possible to reduce the influence of the node in the restoration and continuously reduce the expressive power of the autoencoder.

(4) The comparative inspection engine includes a difference image generation engine that obtains a difference image between the inspection image f" and the estimated no-defects image h" output by inputting the inspection image f" to the autoencoder, and a difference image evaluation engine that determines whether the inspection image f" is no-defects or abnormal based on the difference image. In the learning step, a processing parameter of the difference image generation engine or the difference image evaluation engine is learned based on the abnormality determination correct answer rate.

The present characteristic will be supplemented. Several methods are conceivable to obtain the difference image between the inspection image f" and the estimated no-defects image h". Although a difference between pixel values of both images may be simply got, a slight inconsistency between images that are not abnormal also becomes a difference, and thus there is a risk of causing erroneous determination in abnormality determination of the difference image evaluation engine.

Therefore, for example, it is conceivable to obtain the difference image using a local perturbation difference method (see Yukio MATSUYAMA, Hisashi IWATA, Hitoshi KUBOTA, and Yasuo NAKAGAWA, "Precise visual inspection for LSI wafer patterns by local perturbation pattern matching algorithm", IEICE TPANSACTIONS on Information and Systems D, J72-D2 (12), pp. 2041-2050 (1989), and the like). The local perturbation difference method is a method in which one image is perturbed and matched with the other image in an XY plane and a lightness direction for each local region, and a part that cannot be matched is a difference. A slight inconsistency between images can be eliminated. The perturbation width is one of processing parameters of comparative inspection, and the magnitude of the inconsistency amount to be eliminated changes according to the value.

Some methods are conceivable about the difference image evaluation engine that determines whether the inspection image f" is no-defects or abnormal based on the difference image. For example, it is conceivable to perform determination based on the distribution of the lightness value of the pixel region having a difference, but the size of the distribution to be determined as abnormal and the magnitude of the lightness value are also one of the processing parameters of the comparative inspection.

Here, what is called a rule-based determination algorithm has been described as an example of the difference image generation engine and the difference image evaluation engine, but a machine learning-based algorithm may be used. Even in a machine learning-based algorithm, the processing parameters for learning exist.

In the present embodiment, these processing parameters are optimized using the abnormality determination correct answer rate as an evaluation value. As described in the items (1) to (3), the processing of reducing the expressive power of the autoencoder is performed in order to prevent the autoencoder from restoring images other than those of no-defects as much as possible, but there is a limit in reducing the expressive power while maintaining the abnormality determination correct answer rate. When the expressive power is reduced, even if the input image is no-defects, the estimated no-defects image by the autoencoder is deteriorated, and a difference occurs between the input image and the estimated no-defects image. By adjusting the processing parameter of the comparative inspection engine so that this slight difference is not erroneously determined as abnormal, the autoencoder can further reduce the expressive power and easily generate the no-defects image estimation engine that can restore only no-defects. Simultaneous optimization of the hyperparameter that reduces the expressive power of the autoencoder and the processing parameter of the comparative inspection engine complements the performances of the both and enables more accurate abnormality determination.

(5) The no-defects learning image acquisition step of imaging an inspection target object of no-defects and acquiring the no-defects learning image {f_i} (i=1, . . . , Nf, Nf: number of images), an abnormality learning image acquisition step of acquiring an abnormality learning image {f'_i} (i=1, . . . , Nf, Nf: number of images), the learning step of learning a parameter of the autoencoder using the no-defects learning image {f_i} and the abnormality learning image {f'_i}, the inspection image acquisition step of imaging the inspection target object and acquiring the inspection image f", the no-defects image estimation step of inputting the inspection image f" to the autoencoder to estimate the estimated no-defects image h", and the determination step of performing abnormality determination by the comparative inspection engine from the inspection image f" and the estimated no-defects image h" are included, and in the learning step, the dimensional compression rate Rd of an encoded code layer is maximized or the input signal amount to the code layer or the output signal amount from the code layer is reduced such that the abnormality determination correct answer rates Rc of the no-defects learning image {f_i} and the abnormality learning image {f'_i} become maximum or equal to or greater than the predetermined threshold th with the Rc as evaluation values.

The present characteristic will be supplemented. Abnormality patterns are diverse, and it is generally difficult to exhaustively collect many abnormal images in advance. However, if some abnormal images can be obtained even if partially, the parameters of the autoencoder can be more appropriately learned by learning as an abnormality learning image {f'_i}.

In the present embodiment, the autoencoder is learned using the abnormality determination correct answer rate Rc as an evaluation value, but use of both the no-defects learning image {f_i} and the abnormality learning image {f'_i} enables more accurate estimation of the abnormality determination correct answer rate Rc.

(6) The abnormality learning image {f'_i} is a pseudo abnormal image generated by a pseudo abnormal image generation engine, and the pseudo abnormal image generation engine generates an image by applying image processing to the no-defects learning image {f_i}.

The present characteristic will be supplemented. As described above, it is generally difficult to collect abnormal images, and there is a case where the abnormality learning image {f'_i} cannot be prepared in advance in the item (5), or many abnormality patterns cannot be exhaustively collected even if several abnormality learning images {f'_i} can be prepared.

Therefore, by applying image processing to the no-defects learning image {f_i}, various abnormal images are generated in a pseudo manner and used for learning. The image processing in the pseudo abnormal image generation engine simulates an abnormality that can occur in an actual inspection target, and there are variations of applying adhesion of foreign matters, defectives such as chips, scratches, surface unevenness and dirt, shape deformation, and the like to the no-defects learning images.

Example 1

1. Automatic Abnormality Determination System and Entire Processing Sequence FIG. 1 illustrates an automatic abnormality determination system and an entire processing sequence according to the present embodiment.

The processing sequence in the automatic abnormality determination system of the present embodiment is roughly divided into a learning phase (100) and an inspection phase (101).

In the learning phase (100), the no-defects learning image {f_i} (i=1, . . . , Nf, Nf: number of images) is acquired by imaging an inspection target object (102) of no-defects for learning (103). The image is acquired by imaging, as a digital image, the surface or the inside of the inspection target object with an imaging device such as a CCD camera, an optical microscope, a charged particle microscope, an ultrasonic inspection device, or an X-ray inspection device. Note that as another example of "acquisition", an image imaged by another system may simply be received and stored in a storage resource included in the automatic abnormality determination system.

Next, the no-defects image estimation engine utilizing the autoencoder is learned using the no-defects learning image {f_i}(104). That is, a network parameter of the autoencoder is determined by learning such that a no-defects image is output with the input image as an input.

When learning is performed using the no-defects learning image, which is no-defects, the no-defects learning image is basically input, and the network parameter is determined such that the same no-defects learning image is output.

The network parameter includes a "hyperparameter" such as a network structure and a "model parameter" such as a weight (coupling coefficient) between nodes of the network or bias, and each parameter is determined (105 and 106). The hyperparameter includes the number of layers of the network, the number of nodes in the layer, an activation function, a learning rate, and a learning end condition.

The parameter of the comparative inspection engine that compares the input image and the output image of the no-defects image estimation engine to determine whether the input image is no-defects or abnormal is learned (107).

In the inspection phase (101), the actual inspection target object (102) is imaged (103), the inspection image f" is acquired, and abnormality determination is performed (111).

Specifically, the inspection image f" is input to the autoencoder based on a hyperparameter (108) and a model parameter (109) determined in the learning phase (100), and the estimated no-defects image h" is estimated (112). The inspection image f" and the estimated no-defects image h" are input to the comparative inspection engine based on a comparison inspection processing parameter (110) determined in the learning phase (100) to determine whether the inspection image f" is no-defects or abnormal (113). The inspector confirms this determination result where necessary (114).

2. No-Defects Image Estimation by Autoencoder

Details of no-defects image estimation by the autoencoder will be described with reference to FIG. 2.

The autoencoder (see Geoffrey E. Hinton and R. R. Salakhutdinov, "Reducing the Dimensionality of Data with Neural Networks", Science, 313 (5786), pp. 504-507 (2006)) is what is called a dimensional compression network, and inputs an input image to an input layer (207), compresses the input image once by an encoder (205), and converts the input image into a code layer (209) including fewer nodes than those of the input layer.

Each value of the nodes {g_i} (i=1, . . . , Ng, Ng: number of nodes of code layer) in this code layer can also be regarded as a feature where the input image is dimensionally compressed. This code layer is subjected to restoration processing by a decoder (206), and is returned to an output layer (211) having the number of dimensions of the input image again.

As shown in a processing sequence 200 of the learning phase (no-defects learning), when learning is performed so that the same no-defects image is restored from a no-defects image (202) as an output image h_i (212) with the input image f_i as a no-defects image (202) at the time of learning, the autoencoder is expected to become a no-defects image estimation engine that can restore only no-defects.

Use of the autoencoder thus learned enables abnormality determination to be performed on the actual inspection target object in a processing sequence 201 in the inspection phase (abnormality determination).

That is, when an input inspection image f"_i is no-defects, the autoencoder outputs an image similar to the inspection image f"_i as an estimated no-defects image: h"_i, and thus there is no difference between the inspection image f"_i and the estimated no-defects image: h"_i, and the inspection image f"_i is determined to be no-defects. On the other hand, when the input inspection image f"_i (203) includes an abnormality (204) such as foreign matter adhesion, the autoencoder cannot accurately restore the abnormal portion, and an estimated no-defects image: h"_i (213) without abnormality is output. Therefore, a difference occurs between the inspection image f" _i and the estimated no-defects image: h"_i in the abnormal portion, and the inspection image f"_i is determined to be abnormal.

Figure 2:
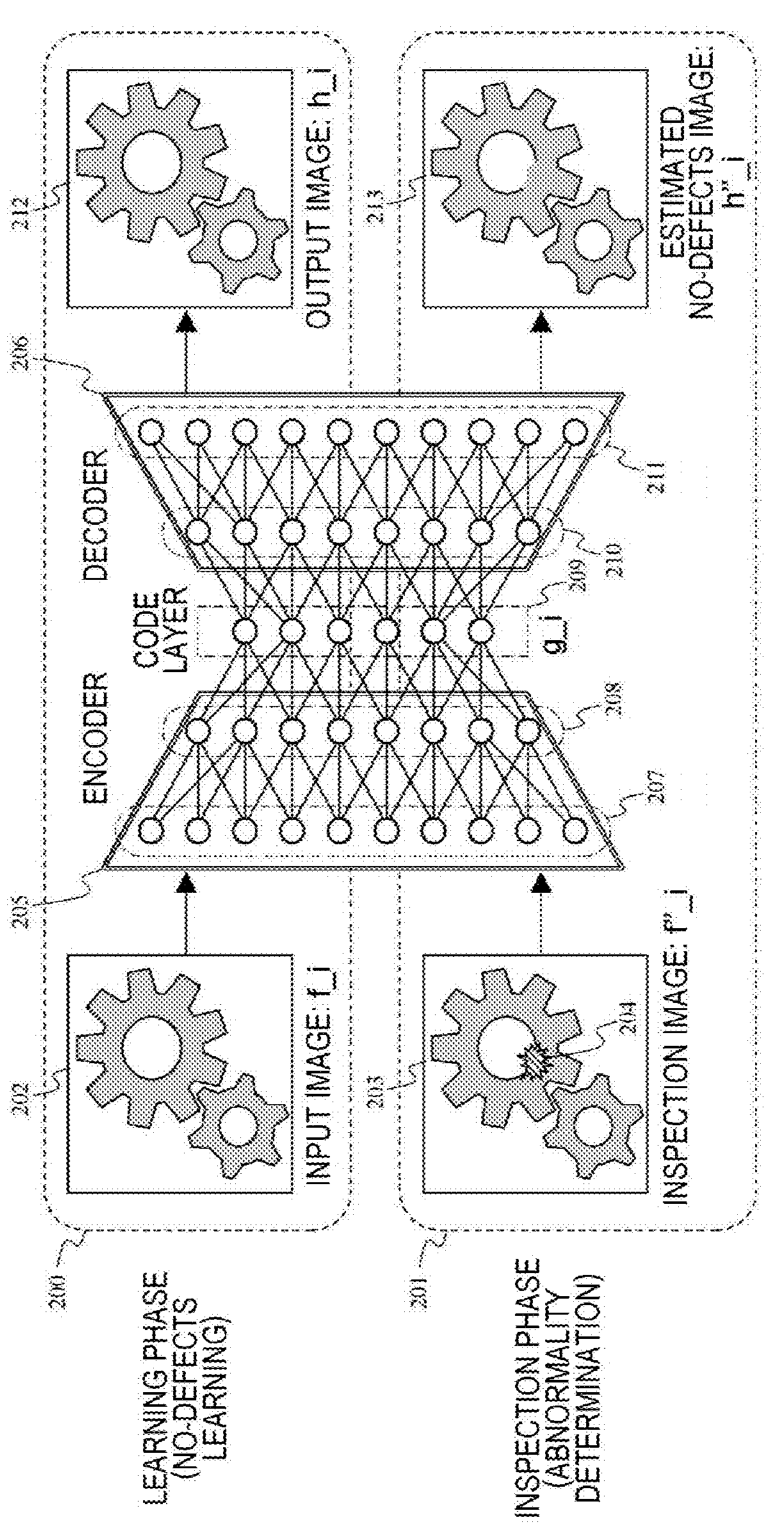
FIG. 2 is a view illustrating no-defects learning and abnormality determination in an autoencoder.

However, the correct abnormality determination result in the inspection phase 201 of FIG. 2 described here is not always obtained. This is because the abnormal image is not explicitly learned in the learning phase, and it is not clear as to what the restoration result for an unknown abnormal image will be. That is, since a no-defects image is learned to be restored from a no-defects image in the learning phase 200, it is expected that a no-defects image is restored from a no-defects image also in the inspection phase 201, but whether or not an abnormal image is restored depends on the type of the abnormality pattern. In an actual experiment, a case where an abnormal image can be restored by the autoencoder and correct abnormality determination cannot be performed has been confirmed. The present example solves this problem.

3. Optimization of Autoencoder 3.1 Basic Processing

In order to solve the above-described problem, the present example includes: the no-defects learning image acquisition step of imaging an inspection target object of no-defects and acquiring the no-defects learning image {f_i} (i=1, . . . , Nf, Nf: number of images), the learning step of learning a parameter of the autoencoder using the no-defects learning image {f_i}, the inspection image acquisition step of imaging the inspection target object and acquiring the inspection image f", the no-defects image estimation step of inputting the inspection image f" to the autoencoder to estimate the estimated no-defects image h", and the determination step of performing abnormality determination by the comparative inspection engine from the inspection image f" and the estimated no-defects image h", and in the learning step, the dimensional compression rate Rd of an encoded code layer is maximized or the input signal amount to the code layer or the output signal amount from the code layer is reduced such that the abnormality determination correct answer rate Rc of the no-defects learning image {f_i} becomes maximum or equal to or greater than the predetermined threshold th with the Rc as an evaluation value.

The present characteristic will be described with reference to FIG. 3. The abnormality determination engine includes a "no-defects image estimation engine (301)" that inputs an inspection image to the autoencoder to obtain an estimated no-defects image, and a "comparative inspection engine (311)" that compares the inspection image (no-defects learning image at the time of learning) with the estimated no-defects image to perform abnormality determination.

The comparative inspection engine may be a rule-based determination algorithm or a machine learning-based determination algorithm such as a neural network.

As described above, it is unclear what estimated no-defects image is output when an inspection image including an unlearned abnormality pattern is input to the autoencoder learned to estimate a no-defects image from a no-defects image. It is also unclear whether abnormality determination of an inspection image can be correctly performed based on the comparison inspection between the inspection image and the estimated no-defects image.

Examples of failing to output the estimated no-defects image include a case where the abnormal image input by the autoencoder can be restored. That is, even if the input image is an abnormal image, if the output image is also an abnormal image similar to the input image, the difference between the input image and the output image is small, and thus it is erroneously determined as no-defects. Therefore, the autoencoder should be learned so as to be able to restore only no-defects images and not to be able to restore other images.

One factor that the autoencoder can restore images other than the no-defects learning images learned by the autoencoder include the fact that expressive power of the autoencoder is too high. Therefore, in the present example, the network structure is optimized to reduce the expressive power of the autoencoder so as to increase the dimensional compression rate Rd of a code layer (306) as much as possible.

When the dimensional compression rate Rd is high, the input image is expressed by a small number of nodes (features) in the code layer (306), and thus the possibility that images other than the no-defects learning images learned by the autoencoder can be expressed can be reduced.

At that time, the dimensional compression rate Rd is maximized with, as an evaluation value, the abnormality determination correct answer rate Rc (calculated in processing 315) obtained from the determination result of the comparative inspection engine (311). That is, the number of nodes of the code layer, which is one of a hyperparameters 309, is minimized.

Normally, the autoencoder is learned so that the no-defects learning image is restored with higher accuracy, but in the abnormality determination, it is not always necessary to obtain a highly accurate estimated no-defects image. That is, it is because even if an estimated no-defects image (310)

obtained by restoring a no-defects image (300) is deteriorated, it is sufficient that correct abnormality determination can be performed in a comparative inspection engine (311).

The abnormality determination correct answer rate Rc is used as the evaluation value when the expressive power of the autoencoder is determined, but the expressive power is determined so that the abnormality determination correct answer rate Rc is improved, and as specific methods, the abnormality determination correct answer rate Rc may be determined to be maximum, or the abnormality determination correct answer rate Rc may be determined to be equal to or greater than the predetermined threshold th (315).

3.2 Specific Example of Optimization of Code Layer

Roughly two types of methods for optimization of the code layer will be described.

First, maximization of the dimensional compression rate Rd of the code layer in the learning step is performed by reducing a number of nodes included in each channel of the code layer or a number of channels.

The present characteristic will be supplemented. As described above, in the present invention, images other than no-defects images cannot be restored by reducing the expressive power of the autoencoder with the abnormality determination correct answer rate Rc as an evaluation value. Methods of reducing the expressive power of the autoencoder include a method of maximizing the dimensional compression rate Rd of the code layer. Specifically, the number of nodes included in each channel of the code layer or the number of channels is reduced. Since the total number of nodes in the code layer can be regarded as the number of features after dimension reduction by the encoder, the reduction of the total number of nodes increases the dimensional compression rate Rd.

Figures 4A, 4B, 4C:
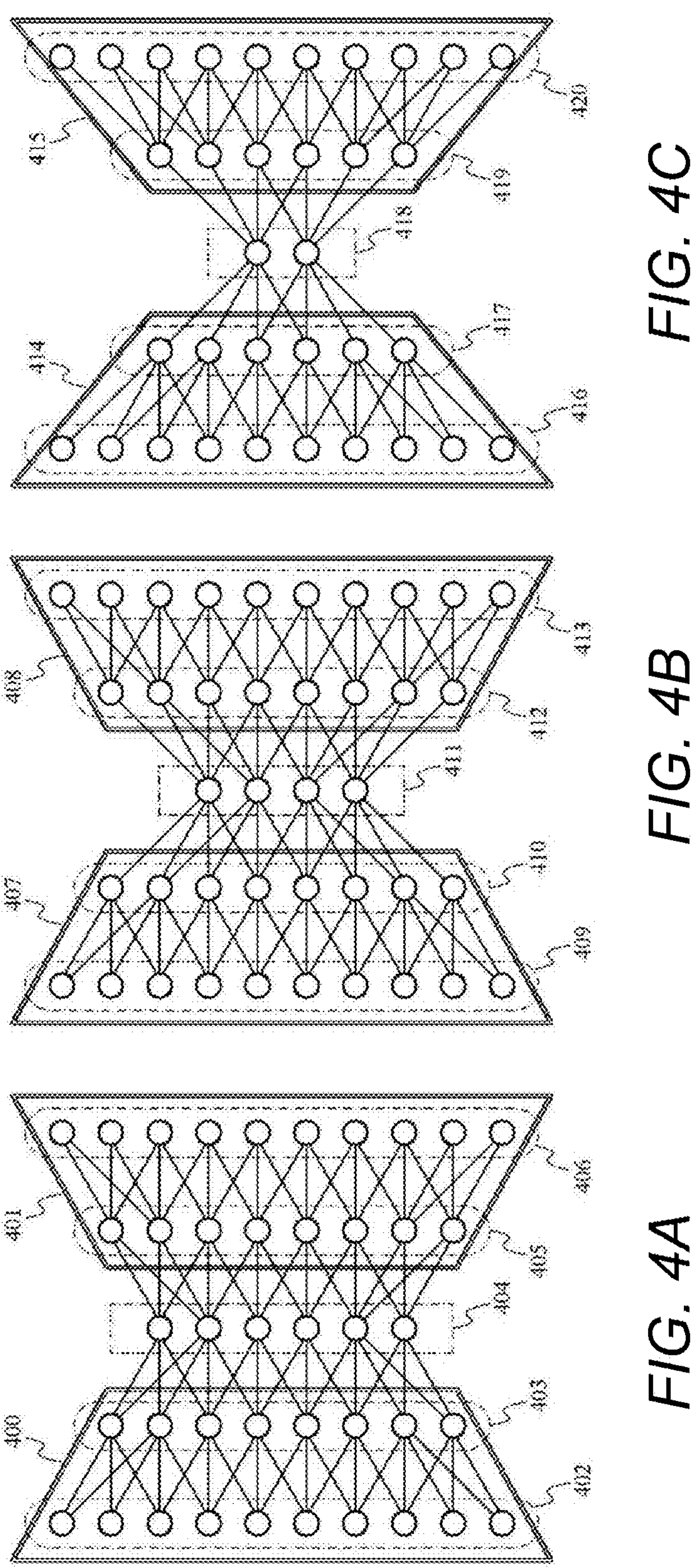
FIGS. 4A-C is a view illustrating an example of the learning method of the autoencoder in the automatic abnormality determination system according to Example 1.

FIGS. 4A-4C illustrates a schematic diagram of a network structure in which each layer is expressed one-dimensionally, and a reduction method of the number of nodes of a specific code layer will be described.

FIG. 4A is an example of a network structure in which the number of nodes in the code layer is relatively large and the expressive power of the autoencoder is high. The number of nodes of an input layer (402) is 10. However, this is a schematic diagram, and when an inspection image is input as it is, the number of nodes of the input layer becomes equal to the number of pixels of the inspection image.

The number of nodes of the input layer (402) is dimensionally compressed to the number of nodes of 6 of a code layer (404) by an encoder (400). That is, the dimensional compression rate Rd is $(10-6)/10\times100=40\%$.

On the other hand, the number of nodes of a code layer (411) in the network structure of FIG. 4B is 4. The dimensional compression rate Rd is $(10-4)/10\times100=60\%$, and the compression ratio has become high. Therefore, when the abnormality determination correct answer rate Rc is improved in FIG. 4B as compared with FIG. 4A, or when the abnormality determination correct answer rate Rc is equal to or greater than the predetermined threshold th also in FIG. 4B, the possibility that an image other than a no-defects learning image can be expressed is further lowered by adopting the network structure of FIG. 4B, and the abnormality determination correct answer rate for an unknown abnormal image should be improved.

In FIG. 4C, the number of nodes of a code layer (418) has become 2. The dimensional compression rate Rd is $(10-2)/10\times100=80\%$, and the compression ratio has become further higher. When the abnormality determination correct answer rate Rc is further improved in FIG. 4C as compared with FIG. 4B, or when the abnormality determination correct answer rate Rc is equal to or greater than the predetermined threshold th also in FIG. 4B, the network structure of FIG. 4C should be adopted, and the network structure with a higher compression rate should also be evaluated. However, if such performance cannot be confirmed, there is a possibility that the no-defects image cannot be accurately restored because the expressive power of the network is excessively lowered, and thus FIG. 4C cannot be adopted.

Note that in FIGS. 4A-4C, both the encoder (400, 407, 414) and the decoder (401, 408, 415) are two-layer networks (e.g., in the encoder 400, a network continuing from the input layer 402 to an intermediate layer 403 and the code layer 404), but a network having two or more layers can be adopted.

The number of nodes of the code layer (404, 411, 418) is also 6, 4, and 2, which are discrete values, has been described as an example, but an arbitrary value can be verified and selected in actual optimization. Furthermore, the network structure (number of layers, number of nodes, number of channels, combination of nodes to which edges are connected, and the like) in the encoder or the decoder can be changed along with the optimization of the number of nodes of the code layer.

Figure 5:
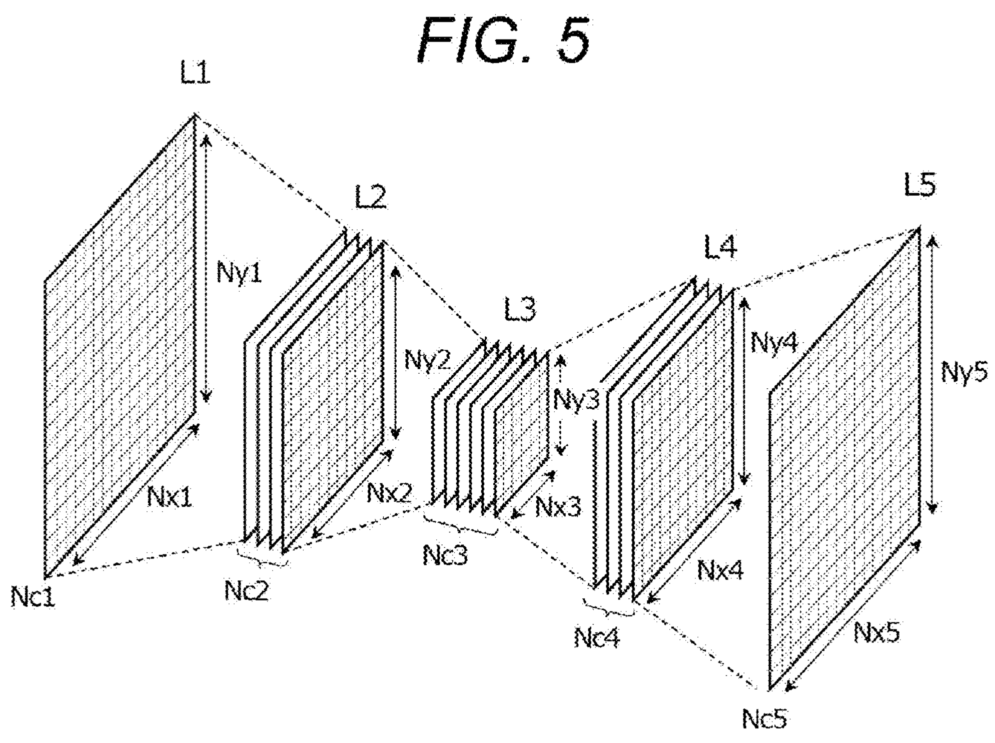
FIG. 5 is a view illustrating an example of a learning method of an autoencoder.

FIG. 5 illustrates a schematic diagram of a network structure in which each layer is expressed two-dimensionally, and a reduction method of the number of nodes of a specific code layer will be described.

Although FIGS. 4A-4C illustrate an image in which the pixel values of the inspection image are connected in a line and input as a one-dimensional array, the inspection image in which the number of horizontal pixels is Nx1 and the number of vertical pixels is Ny1 as illustrated in FIG. 5 may be input as it is in an input layer (L1) including a two-dimensional node array of Nx1×Ny1.

An intermediate layer (L2) is generally obtained by performing convolution and pooling on the input layer (L1). An image size Nx2×Ny2 of the intermediate layer becomes smaller than Nx1×Ny1 by the pooling.

At this time, a plurality of images are generated by providing a plurality of convolution filters. This number of images is called the number of channels, and the number of channels is Nc2 in the intermediate layer (L2).

Similarly, a code layer (L3) is generated from the intermediate layer (L2), and the code layer (L3) has an image size Nx3×Ny3 and the number of channels of Nc3. Up to this is the encoder. A network that obtains an output layer (L5) having an original image size (Nx1=Nx5, Ny1=Ny5) from the code layer (L3) through the intermediate layer (L4) is a decoder.

In the present example, the expressive power of the autoencoder is reduced with the abnormality determination correct answer rate Rc as an evaluation value, but as a method thereof, there is a technique of reducing the number of nodes (Nx3×Ny3) or the number of channels (Nc3) included in each channel of the code layer.

Second, in the learning step, reduction of the input signal amount to the code layer is performed by setting, among weights w_ij of a j-th input signal {x_ij} (i=1, . . . , Nn, Nn: number of nodes of code layer, j=1, . . . , Nx_i, Nx_i: number of input signals to i-th node of code layer) to an i-th node of the code layer, a value of a weight {w_ij|(i, j)∈Φ} (Φ: set of numbers (i, j) of weights w_ij for setting the value to zero) for at least one or more nodes to zero or a value close to zero, and the set Φ is a set ({Φ={(i, j)}|x_ij≤x_min}) of numbers (i, j) in which the input signal {x_ij} becomes equal to or less than a certain value x_min when the no-defects learning image {f_i} is input to the autoencoder.

The present characteristic will be supplemented. As a method of reducing the expressive power of the autoencoder with the abnormality determination correct answer rate Rc as the evaluation value, a method of decreasing the values of some input signals to nodes included in the code layer may be adopted. That is, in order to reduce the expressive power of the autoencoder, a direct method of reducing the number of nodes as described above may be adopted. However, not by choosing whether to leave or delete a certain node but by reducing the value of the input signal to the node, it is possible to reduce the influence of the node in the restoration and continuously reduce the expressive power of the autoencoder.

This will be specifically described with reference to FIGS. 6 and 7.

Figure 6:
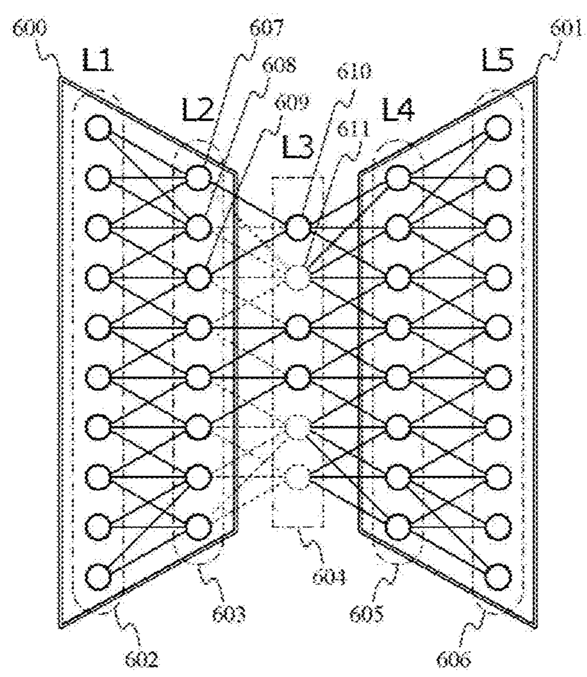
FIG. 6 is a view illustrating an example of the learning method of the autoencoder in the automatic abnormality determination system according to Example 1.

FIG. 6 is an example of an autoencoder that perform estimation of a no-defects image in the present example. There are five layers L1 to L5, and L3 is a code layer (604).

Figure 7:
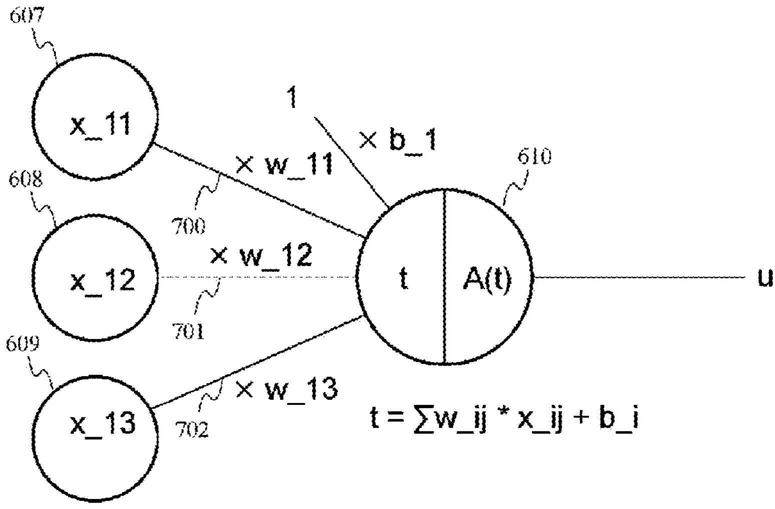
FIG. 7 is a view illustrating input/output of nodes in a neural network in the automatic abnormality determination system according to Example 1.

A first (i=1) node (610) in the code layer and three nodes (607, 608, 609) in the intermediate layer (L2) connected to the first node (610) in the code layer by an edge are picked up and illustrated in FIG. 7.

A signal amount u output from the node (610) is calculated by the following equations from signal amounts {x_lj} (j=1, 2, 3) output from the three nodes (607, 608, 609).

$$u = A(t) \quad \text{(Equation 1)}$$

$$t = w\_11 * x\_11 + w\_12 * x\_12 + w\_13 * x\_13 + b\_1 \quad \text{(Equation 2)}$$

Here, A( ) is an activation function, various nonlinear functions have been proposed, and recently ReLU (ramp function) has been widely used. In addition, {w_1*j*} is a weight of an edge connecting the j-th node in the intermediate layer (L2) and the first node in the code layer (L3), and b_1 is a bias amount, both of which are the model parameters (109) optimized by learning.

In the present example, the expressive power of the autoencoder is reduced by intentionally setting some of the weights to zero or a value close to zero. The magnitude of the signal amount can be used as one of the criteria for setting the weight small. When the no-defects image is input to an input layer (602), the edge having a small signal amount can be considered to not greatly contribute to expressing the no-defects image. For example, when a signal amount x_12 is small in FIG. 7, the value of a weight w_12 of an edge 701 is corrected small with respect to the value set by learning.

Here, it has been described that the value is set to be small with the weight from the intermediate layer (L2) to the code layer (L3) as an example, but the value can be similarly set to be small for a weight between arbitrary layers. The value is set small, and as the value becomes close to zero, the weighted edge is invalidated more. As a result, the expressive power of the autoencoder decreases, and an effect equivalent to that of increasing the dimensional compression rate Rd can be obtained without reducing the total number of nodes.

4. Processing Parameter Adjustment of Comparative Inspection Engine

The comparative inspection engine includes a difference image generation engine that obtains a difference image between the inspection image f" and the estimated no-defects image h" output by inputting the inspection image f" to the autoencoder, and a difference image evaluation engine that determines whether the inspection image f" is no-defects or abnormal based on the difference image. In the learning step, a processing parameter of the difference image generation engine or the difference image evaluation engine is learned based on the abnormality determination correct answer rate.

The present characteristic will be described with reference to FIG. 3. In the present example, the inspection image f"_i is input to the no-defects image estimation engine (autoencoder), and the estimated no-defects image h"_i is output. The inspection image f"_i and the estimated no-defects image h"_i are compared by the comparative inspection engine (311) to determine whether the inspection image f"_i is no-defects or abnormal.

Various algorithms can be used for comparison, and as an example, a comparative inspection engine including a difference image generation engine (312) and a difference image evaluation engine (313) will be considered.

In the difference image generation engine (312), several methods are considered for obtaining the difference image between the inspection image f" and the estimated no-defects image h". Although a difference between pixel values of both images may be simply got, a slight inconsistency between images that are not abnormal also becomes a difference, and thus there is a risk of causing erroneous determination in abnormality determination of the difference image evaluation engine. Therefore, for example, it is conceivable to obtain the difference image using a local perturbation difference method (see Yukio MATSUYAMA, Hisashi IWATA, Hitoshi KUBOTA, and Yasuo NAKAGAWA, "Precise visual inspection for LSI wafer patterns by local perturbation pattern matching algorithm", IEICE TPANSACTIONS on Information and Systems D, J72-D2 (12), pp. 2041-2050 (1989), and the like).

The local perturbation difference method is a method in which one image is perturbed and matched with the other image in an XY plane and a lightness direction for each local region, and a part that cannot be matched is a difference. A slight inconsistency between images can be eliminated. The perturbation width is one of processing parameters (314) of comparative inspection, and the magnitude of the inconsistency amount to be eliminated changes according to the value.

Some methods are conceivable about the difference image evaluation engine (313) that determines whether the inspection image f" is no-defects or abnormal based on the difference image. For example, it is conceivable to perform determination based on the distribution of the lightness value of the pixel region having a difference, but the size of the distribution to be determined as abnormal and the magnitude of the lightness value are also one of the processing parameters (314) of the comparative inspection.

Here, what is called a rule-based determination algorithm has been described as an example of the difference image generation engine (312) and the difference image evaluation engine (313), but a machine learning-based algorithm may be used. Even in a machine learning-based algorithm, the processing parameters (314) for learning exist.

In the present example, these processing parameters are optimized using the abnormality determination correct answer rate as an evaluation value. As described above, the processing of reducing the expressive power of the autoencoder is performed in order to prevent the autoencoder from restoring images other than those of no-defects as much as possible, but there is a limit in reducing the expressive power while maintaining the abnormality determination correct answer rate. When the expressive power is reduced, even if the input image is no-defects, the estimated no-defects image by the autoencoder is deteriorated, and a difference occurs between the input image and the estimated no-defects image.

By adjusting the processing parameter of the comparative inspection engine so that this slight difference is not erroneously determined as abnormal, the autoencoder can further reduce the expressive power and easily generate the no-defects image estimation engine that can restore only no-defects. By performing, in the processing 315, simultaneous optimization of the hyperparameter (309) that reduces the expressive power of the autoencoder and the processing parameter (314) of the comparative inspection engine, the performances of the both are complemented and more accurate abnormality determination is enabled.

As in the local perturbation difference method, use of a technique of not detecting a slight inconsistency as a difference in comparison between the inspection image f" and the estimated no-defects image h" in the difference image generation engine is one of the features of the present example. This is because, as described later with reference to FIG. 11, in the present example, even if the restoration accuracy of the estimated no-defects image is rather sacrificed, the expressive power of the autoencoder is reduced, and the abnormality determination correct answer rate Rc is improved by reliably detecting an abnormality pattern. For this, it is essential to use a technique with low sensitivity for slight differences that occur in no-defects.

Therefore, according to the present example, it is possible to achieve an abnormality determination computer and an abnormality determination method that can perform highly accurate abnormality determination on an unknown abnormal image even in learning using only a no-defects image in abnormality determination using an autoencoder.

Example 2

5. Optimization of Abnormality Determination Method Using Pseudo Abnormal Image The no-defects learning image acquisition step of imaging an inspection target object of no-defects and acquiring the no-defects learning image {f_i} (i=1, . . . , Nf, Nf: number of images), an abnormality learning image acquisition step of acquiring an abnormality learning image {f'_i} (i=1, . . . , Nf, Nf: number of images), the learning step of learning a parameter of the autoencoder using the no-defects learning image {f_i} and the abnormality learning image {f'_i}, the inspection image acquisition step of imaging the inspection target object and acquiring the inspection image f", the no-defects image estimation step of inputting the inspection image f" to the autoencoder to estimate the estimated no-defects image h", and the determination step of performing abnormality determination by the comparative inspection engine from the inspection image f" and the estimated no-defects image h" are included, and in the learning step, the dimensional compression rate Rd of an encoded code layer is maximized or the input signal amount to the code layer or the output signal amount from the code layer is reduced such that the abnormality determination correct answer rates Rc of the no-defects learning image {f_i} and the abnormality learning image {f'_i} become maximum or equal to or greater than the predetermined threshold th with the Rc as evaluation values.

The present characteristic will be described with reference to FIG. 8. Abnormality patterns are diverse, and it is generally difficult to exhaustively collect many abnormal images in advance. However, if some abnormal images can be obtained even if partially, the parameters of the autoencoder can be more appropriately learned by learning as an abnormality learning image {f'_i}.

That is, when a no-defects learning image f_i (800) and an estimated no-defects image h_i (812) are similar as much as possible, and an abnormality learning image f'_i (802) and an estimated no-defects image h'_i (813) deviate as much as possible in an abnormal portion, the abnormality determination correct answer rate Rc tends to improve.

In the present example, the autoencoder is learned with the abnormality determination correct answer rate Rc as an evaluation value, but use of both the no-defects learning image {f_i} (800) and the abnormality learning image {f'_i} (802) enables the abnormality determination correct answer rate Rc to be more accurately estimated.

The abnormality learning image {f'_i} is a pseudo abnormal image generated by a pseudo abnormal image generation engine, and the pseudo abnormal image generation engine generates an image by applying image processing to the no-defects learning image {f_i}.

The present characteristic will be described with reference to FIG. 8. As described above, it is generally difficult to collect abnormal images, and there is a case where the abnormality learning image {f'_i} (802) cannot be prepared in advance, or many abnormality patterns cannot be exhaustively collected even if several abnormality learning images {f'_i} can be prepared. Therefore, by applying image processing to the no-defects learning image {f_i} (800), various abnormal images are generated in a pseudo manner and used for learning.

In that case, since the no-defects learning image (800) serving as the source when the abnormality learning image f'_i is generated in a pseudo manner exists, in the learning, the abnormality determination correct answer rate Rc tends to improve when the no-defects learning image (800) corresponding to the estimated no-defects image h'_i (813) is similar as much as possible.

Figure 9:
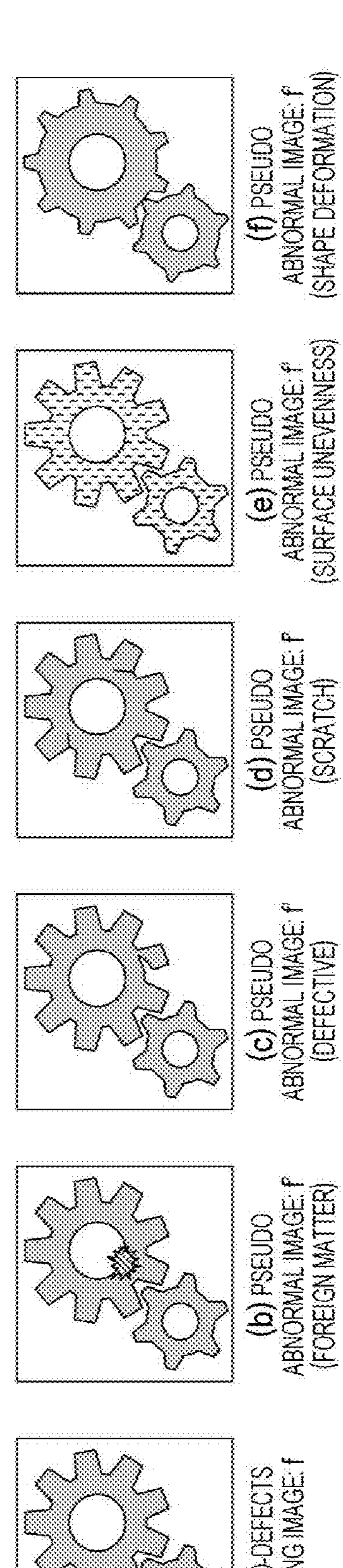
FIG. 9 is a view illustrating a variation of an abnormal image generated in a pseudo manner in the automatic abnormality determination system according to Example 2.

The image processing in a pseudo abnormal image generation engine (801) simulates an abnormality that can occur in an actual inspection target, and as illustrated in FIG. 9, there are variations of applying adhesion of foreign matters (FIG. 9 (*b*)), defectives such as chips (FIG. 9 (*c*)), scratches (FIG. 9 (*d*)), surface unevenness or dirt (FIG. 9 (*e*)), shape deformation (FIG. 9 (*f*)), and the like to the no-defects learning images (FIG. 9 (*a*)).

Also in the abnormality determination using the pseudo abnormal image illustrated in FIG. 8, similarly to FIG. 3 in which the pseudo abnormal image is not used, a hyperparameter (811) (number of nodes in code layer, and the like) and a comparison inspection processing parameter (817) (e.g., a processing parameter of a difference image generation engine (815) or a difference image evaluation engine (816), and the like) are learned based on the abnormality determination correct answer rate Rc in the learning step. In addition, a processing parameter (generation method of pseudo abnormal image, number of generated images, and the like) of the image processing in the pseudo abnormal image generation engine (801) is learned based on the abnormality determination correct answer rate Rc.

Simultaneous optimization of the hyperparameter (811), the comparison inspection processing parameter (817), and the processing parameter of the pseudo abnormal image generation engine (801) can be performed in processing 818.

Since it is difficult to exhaustively collect variations of abnormality patterns as a real problem, it is required to achieve the performance of abnormality determination by no-defects teaching. On the other hand, it is essentially difficult to achieve performance for an unknown abnormality pattern. Therefore, an effort that can be made only with information on a no-defects image is to generate an autoencoder that restores only no-defects. For this, it becomes important to reduce the expressive power of the code layer as much as possible while maintaining the abnormality determination correct answer rate Rc by fully adjusting all the processing parameters such as the processing parameters of the comparative inspection engine and the processing parameters of the pseudo abnormal image generation engine.

Therefore, according also to the present example, it is possible to achieve an abnormality determination computer and an abnormality determination method that can perform highly accurate abnormality determination on an unknown abnormal image even in learning using only a no-defects image in abnormality determination using an autoencoder.

6. Processing Result Example

Effects of the present embodiment will be described using a processing result example.

Figure 10:
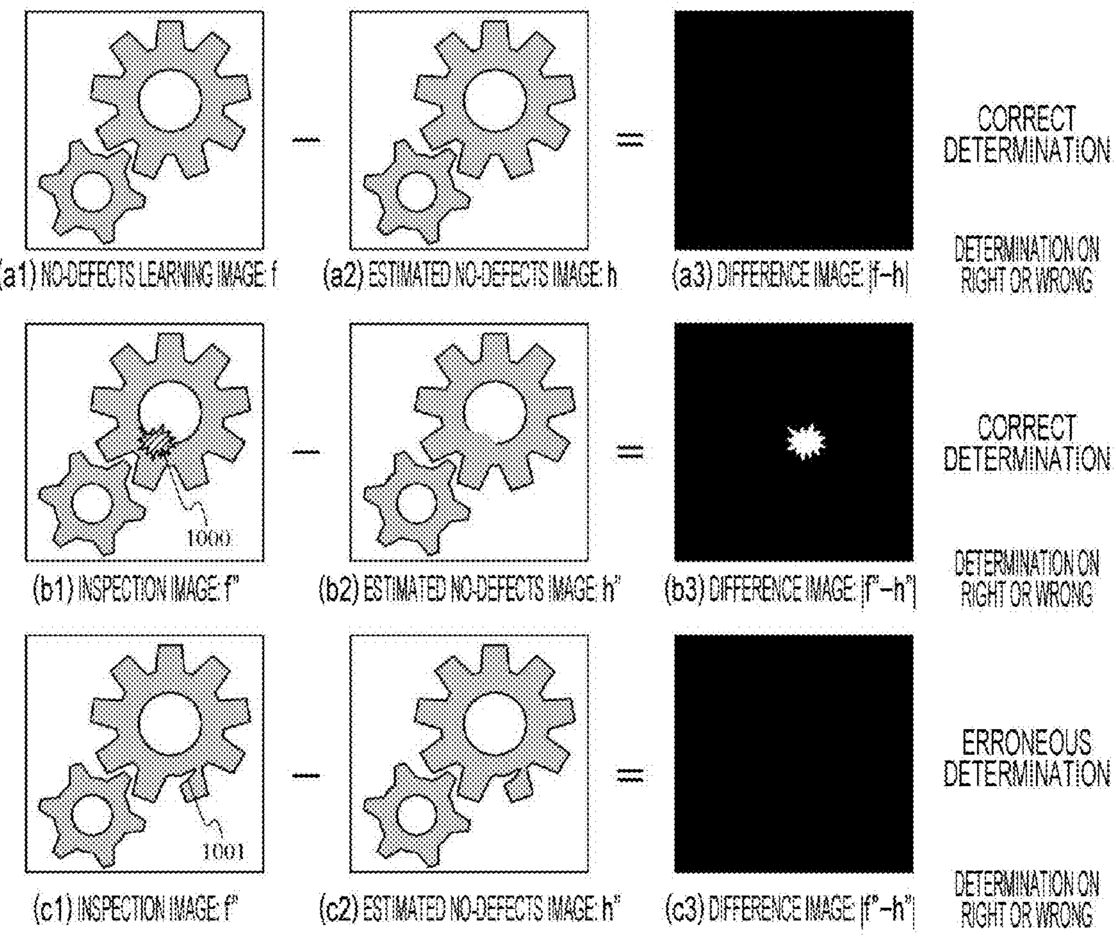
FIG. 10 is a view illustrating a result of abnormality determination in a common technique.

FIG. 10 illustrates a processing result of abnormality determination by a general autoencoder.

In the learning phase illustrated in the upper part of FIG. 10, the no-defects learning image f (FIG. 10(*a*1)) is input to the autoencoder to output the estimated no-defects image h (FIG. 10(*a*2)), and the model parameter of the autoencoder is learned so that the no-defects learning image f and the estimated no-defects image h are similar to each other. As a result, the simple difference (FIG. 10(*a*3)) between the no-defects learning image f and the estimated no-defects image h is almost never present, and the no-defects image is correctly determined to be no-defects.

In the inspection phase, abnormality determination of the inspection image f" is performed using the autoencoder thus learned. Depending on the type of the abnormality pattern, there is a case where correct abnormality determination is performed as illustrated in the middle part of FIG. 10. That is, this is a case where the abnormal portion cannot be restored in the estimated no-defects image h"(FIG. 10(*b*2)) output by inputting, to the autoencoder, the inspection image f" (FIG. 10(*b*1)) including a foreign matter (1000) as the abnormal portion. At this time, since the abnormal portion is extracted as a difference (FIG. 10(*b*3)) between the inspection image f" and the estimated no-defects image h", the inspection image f" is correctly determined to be abnormal.

On the other hand, as illustrated in the lower part of FIG. 10, there is a case where correct abnormality determination is not performed. That is, this is a case where the abnormal portion can be restored in the estimated no-defects image h"(FIG. 10(*c*2)) output by inputting, to the autoencoder, the inspection image f" (FIG. 10(*c*1)) including a defective (1001) as the abnormal portion. At this time, since the abnormal portion is not extracted as a difference (FIG. 10(*c*3)) between the inspection image f" and the estimated no-defects image h", the inspection image f" is erroneously determined to be no-defects.

This is because the learning of the autoencoder is performed so as to estimate the same no-defects image from the no-defects image, and when an unknown abnormal image that having not been used for learning is input, a good estimated no-defects image, that is, an estimated no-defects image from which the abnormal portion is removed from the input abnormal image is not always output.

On the other hand, in the present embodiment, images other than no-defects images cannot be restored by reducing the expressive power of the autoencoder with the abnormality determination correct answer rate Rc as an evaluation value.

Figure 11:
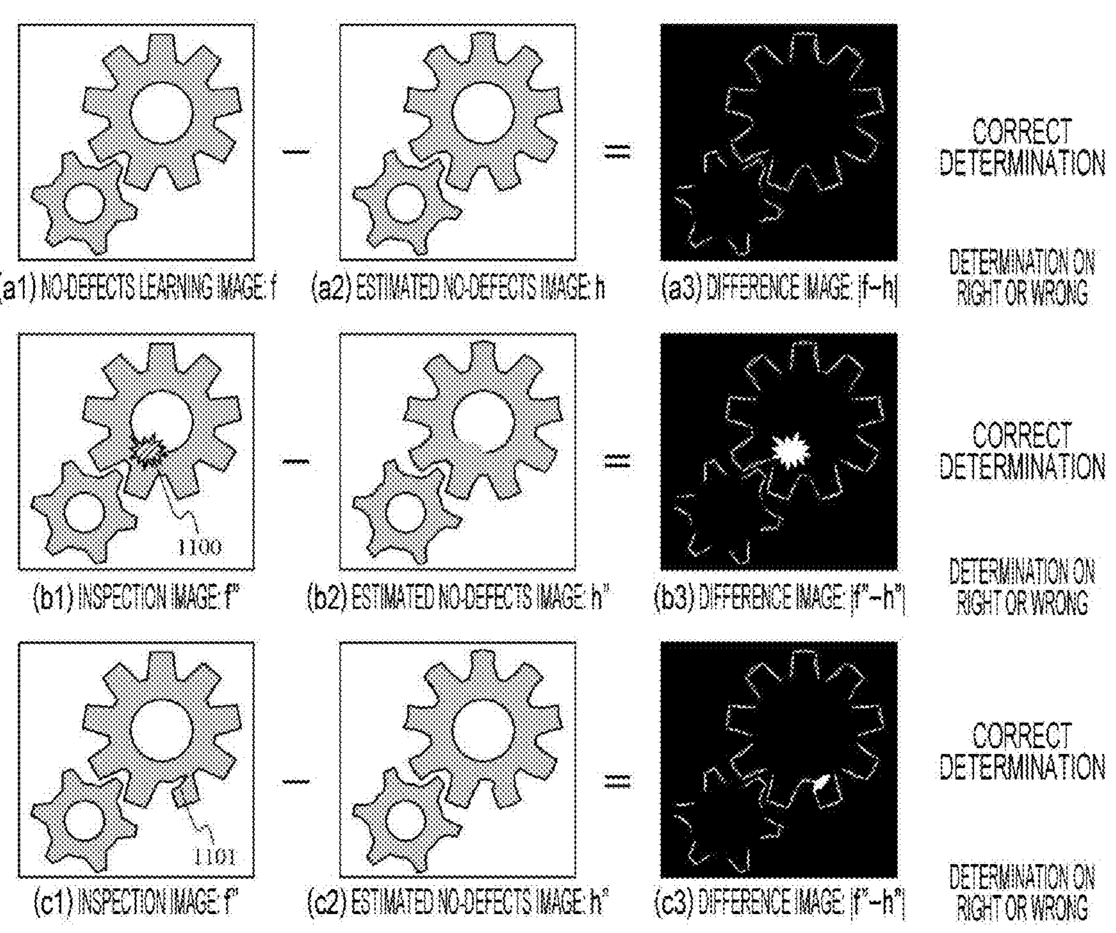
FIG. 11 is a view illustrating a result of abnormality determination in an automatic abnormality determination system according to an embodiment.

FIG. 11 illustrates a processing result of abnormality determination by the autoencoder according to the present embodiment.

In the learning phase illustrated in the upper part of FIG. 11, the no-defects learning image f (FIG. 11(*a*1)) is input to the autoencoder to output the estimated no-defects image h (FIG. 11(*a*2)), and the hyperparameter is determined such that the expressive power of the autoencoder is reduced as much as possible with the abnormality determination correct answer rate Rc as an evaluation value.

As a result of reducing the expressive power, the restoration accuracy of the estimated no-defects image h (FIG. 11(*a*2)) is also reduced (e.g., the shape is rather distorted with respect to the no-defects learning image, or the like), and even if the input image is no-defects, there is a possibility that a difference (FIG. 11(*a*3)) between the no-defects learning image f and the estimated no-defects image h occurs. However, in the present embodiment, since the restoration accuracy in no-defects learning is not a direct evaluation value but the abnormality determination correct answer rate Rc is an evaluation value, there is no problem as long as the value of Rc is high. That is, whether the input image is no-defects or abnormal is not simply determined by the presence or absence of a simple difference between the no-defects learning image f and the estimated no-defects image h, but is determined by the comparative inspection engine, and therefore it is only required to be able to adjust the processing parameter of the comparative inspection engine so that correct abnormality determination can be performed even if a slight difference occurs.

Even if the restoration accuracy is rather sacrificed while the abnormality determination correct answer rate Rc is maintained, there is an increased possibility that an unknown abnormal image cannot be restored by reducing the expressive power of the autoencoder. As a result, as illustrated in the middle part of FIG. 11, the inspection image f" (FIG. 11(*b*1)) including a foreign matter (1100) that could have not been ever restored in the estimated no-defects image h" (FIG. 11(*b*2)) can be correctly determined as abnormal, and as illustrated in the lower part of FIG. 11, a defective (1101) that could have been ever restored cannot be restored in the estimated no-defects image h" (FIG. 11(*c*2)), and the inspection image f" (FIG. 11(*c*1)) can be correctly determined to be abnormal.

7. Hardware Configuration of Automatic Abnormality Determination System

Figure 12:
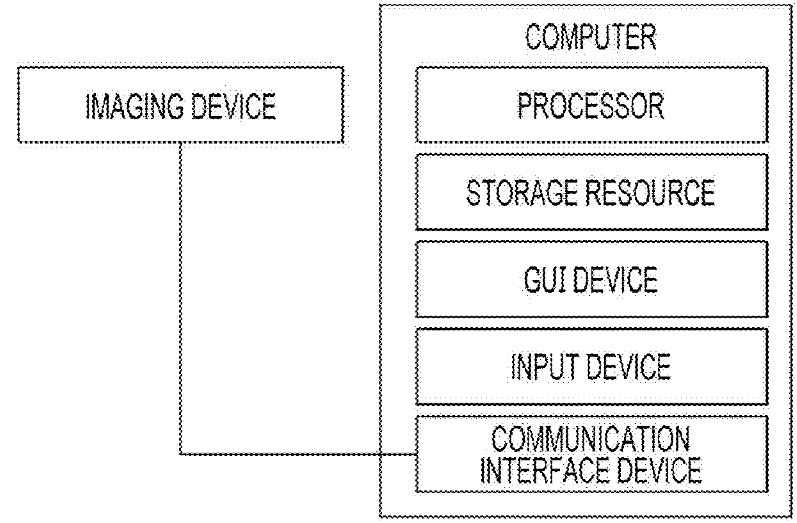
FIG. 12 is a view illustrating a hardware configuration of the automatic abnormality determination system according to the embodiment.

FIG. 12 illustrates an abnormality determination system that implements the abnormality determination method described in the above embodiment.

The abnormality determination system includes the above-described imaging device and a computer (abnormality determination computer). An example of the imaging device is as described above.

The computer is a component that processes the abnormality determination method described in the present embodiment, and includes the followings.

Processor: Examples of the processor include a central processing unit (CPU), a graphics processing unit (GPU), and a field-programmable gate array (FPGA), but another component may be used as long as the abnormality determination method can be processed.

Storage resource: Examples of the storage resource include a random access memory (RAM), a read only memory (ROM), a hard disk drive (HDD), and a nonvolatile memory (a flash memory or the like). The storage resource may store a program (called an abnormality determination program) that causes the processor to execute the abnormality determination method described in the above embodiment.

Graphical user interface (GUI) device: Examples of the GUI device include a display and a projector, but another device may be used as long as the GUI can be displayed.

Input device: Examples of the input device include a keyboard, a mouse, and a touchscreen, but another device may be used as long as it is a component that can receive a user operation. The input device and the GUI device may be an integrated device.

Communication interface device: Examples of the communication interface include a universal serial bus (USB), Ethernet (registered trademark), and Wi-Fi (registered trademark), but another interface device may be used as long as it is an interface that can directly receive an image from the imaging device or that allows the user to transmit the image to the computer. A portable nonvolatile storage medium (e.g., a flash memory, a digital versatile disk (DVD), a CD-ROM, a Blu-ray disk, or the like) storing the image may be connected to the communication interface, and the image may be stored in the computer.

The above is the hardware configuration of the computer. Note that a plurality of computers may constitute the abnormality determination system and a plurality of imaging devices may be used.

Note that the abnormality determination program described above may be stored in the computer through the following path:

The abnormality determination program is stored in the portable nonvolatile storage medium, and the medium is connected to the communication interface to distribute the program to the computer.

A program distribution server distributes the abnormality determination program to the computer. Note that the program distribution server includes the storage resource storing the abnormality determination program, the processor that performs distribution processing of distributing the abnormality determination program, and the communication interface device that can communicate with the communication interface device of the computer.

8. Others

This is the end of the description of the embodiment. As described above, the embodiment described so far does not limit the invention according to the claims, and all the elements and combinations thereof described in the embodiment are not necessarily essential to the solution of the invention.

As an example, although the two-dimensional image data is handled as the input information in the present embodiment, the present invention can also be applied to a case where a one-dimensional signal such as a received wave of an ultrasonic wave or three-dimensional volume data acquired by a laser range finder or the like is the input information. The present embodiment can also be applied to a case where there are a plurality of input images and there are a plurality of types of estimated evaluation values (evaluation engine has multiple inputs and multiple outputs).

In the embodiment, the abnormality determination of two choices of whether the inspection image is no-defects or abnormal is handled, but an "abnormality degree" where the degree of abnormality according to, for example, the magnitude of the abnormality or the fatal degree is quantified may be estimated as a continuous amount. If the abnormality degree is zero or a small value, it can be regarded as no-defects, but a large value is determined to be abnormal. As the abnormality degree further increases, it can be determined that a serious abnormality has occurred.

As an estimation method, it is conceivable to calculate the abnormality degree according to the degree of difference between the inspection image and the estimated no-defects image in the comparative inspection engine. It is conceivable that the user also teaches the abnormality degree of a learning image in the learning phase, and learns the hyper-parameters (309, 811) and the comparative inspection processing parameters (314, 817) so that the learning image has the abnormality degree having been taught.

Some or all of the above configurations, functions, processing units, processing means, and the like may be implemented with hardware by, for example, designing them with an integrated circuit. The present invention can also be implemented by a program code of software that implements the functions of the examples. In this case, a storage medium in which the program code is recorded is provided to the computer, and the processor included in the computer reads the program code stored in the storage medium. In this case, the program code itself having been read from the storage medium implements the functions of the above-described examples, and the program code itself and the storage medium storing the program code constitute the present invention. As the storage medium for supplying such program code, for example, a flexible disk, a CD-ROM, a DVD-ROM, a hard disk, a solid state drive (SSD), an optical disk, a magneto-optical disk, a CD-R, a magnetic tape, a nonvolatile memory card, a ROM, or the like is used.

The program code for implementing the functions described in the present example can be implemented by a wide range of programs or script languages such as assembler, C/C++, perl, Shell, PHP, Java (registered trademark), and Python.

Furthermore, the entirety or part of the program code of the software for implementing the functions of each example may be stored in advance in the storage resource of the computer, or may be stored in the storage resource of the computer from a non-transitory storage device of another device connected to the network or from a non-transitory storage medium via an external I/F not illustrated included in the computer as necessary.

Furthermore, by distributing, via the network, the program code of the software for implementing the functions of the examples, the program code may be stored in a storage means such as a hard disk or a memory of the computer or a storage medium such as a CD-RW or a CD-R, and the processor included in the computer may read and execute the program code stored in the storage means or the storage medium.

The control lines and the information lines indicated in the above-described examples are those considered to be necessary for description, and all the control lines and the information lines in the product are not necessarily indicated. All the configurations may be connected to one another.

REFERENCE SIGNS LIST

102 inspection target object
300, 800 no-defects learning image
301, 803 no-defects image estimation engine
306, 404, 411, 418, 604 code layer
310, 812, 813 estimated no-defects image
311 comparative inspection engine
312, 815 difference image generation engine
313, 813 difference image evaluation engine
801 pseudo abnormal image generation engine
802 abnormality learning image

The invention claimed is:

1. An abnormality determination computer that determines an abnormality of an inspection target object, the abnormality determination computer comprising a processor, wherein the processor executes a no-defects learning image acquisition step of acquiring a no-defects learning image {f_i} (i=1, . . . , Nf, Nf: number of images) obtained by imaging the inspection target object of no-defects, a learning step of learning a parameter of an autoencoder using the no-defects learning image {f_i}, an inspection image acquisition step of acquiring an inspection image f" obtained by imaging the inspection target object, a no-defects image estimation step of inputting the inspection image f" to the autoencoder to estimate an estimated no-defects image h", and a determination step of performing abnormality determination by a comparative inspection engine from the inspection image f" and the estimated no-defects image h", and in the learning step, a dimensional compression rate Rd of a code layer of the autoencoder is maximized, or an input signal amount to the code layer is reduced, or an output signal amount from the code layer is reduced, such that an abnormality determination correct answer rate Rc of the no-defects learning image {f_i} becomes maximum, or equal to or greater than a predetermined threshold th, with the abnormality determination correct answer rate Rc as an evaluation value.

2. The abnormality determination computer according to claim 1, wherein maximization of the dimensional compression rate Rd of the code layer in the learning step is performed by reducing a number of nodes included in each channel of the code layer or a number of channels.

3. The abnormality determination computer according to claim 1, wherein reduction of the input signal amount to the code layer in the learning step is performed by setting, among weights w_ij of a j-th input signal {x_ij} (i=1, . . . , Nn, Nn: number of nodes of code layer, j=1, . . . , Nx_i, Nx_i: number of input signals to i-th node of code layer) to an i-th node of the code layer, a value of a weight {w_ij|(i, j)∈Φ} (Φ: set of numbers (i, j) of weights w_ij for setting the value to zero) for at least one or more nodes to zero a predetermined value below a threshold, and wherein the set Φ comprises pairs (i, j) identifying weights w_ij to be set to zero, where each pair (i, j) corresponds to an input signal x_ij that is equal to or less than a minimum value x_min when the no-defects learning image {f_i} is input to the autoencoder.

4. The abnormality determination computer according to claim 1, wherein the comparative inspection engine includes a difference image generation engine that obtains a difference image between the inspection image f" and the estimated no-defects image h", and a difference image evaluation engine that determines whether the inspection image f" is no-defects or abnormal based on the difference image, and in the learning step, a processing parameter of the difference image generation engine or the difference image evaluation engine is learned based on the abnormality determination correct answer rate Rc.

5. The abnormality determination computer according to claim 4, wherein the difference image generation engine obtains the difference image using a local perturbation difference method, and a processing parameter of the difference image generation engine includes at least a perturbation width.

6. The abnormality determination computer according to claim 1, comprising an abnormality learning image acquisition step of acquiring an abnormality learning image {f'_i} (i=1, . . . , Nf, Nf: number of images), wherein in the learning step, a parameter of the autoencoder is learned using the no-defects learning image {f_i} and the abnormality learning image {f'_i}, and furthermore, in the learning step, with the abnormality determination correct answer rates Rc of the no-defects learning image {f_i} and the abnormality learning image {f'_i} as evaluation values, the dimensional compression rate Rd of the code layer having been encoded is maximized or the input signal amount to the code layer or the output signal amount from the code layer is reduced so that the abnormality determination correct answer rate Rc becomes maximized or equal to or greater than a predetermined threshold th.

7. The abnormality determination computer according to claim 6, wherein the abnormality learning image acquisition step includes a pseudo abnormal image generation engine, and the pseudo abnormal image generation engine generates the abnormality learning image {f'_i}, which is a pseudo abnormal image, by applying image processing to the no-defects learning image {f_i}.

8. The abnormality determination computer according to claim 7, wherein in the learning step, a processing parameter of the pseudo abnormal image generation engine is learned based on the abnormality determination correct answer rate Rc.

9. The abnormality determination computer according to claim 6, wherein the comparative inspection engine includes a difference image generation engine that obtains a difference image between the inspection image f" and the estimated no-defects image h", and a difference image evaluation engine that determines whether the inspection image f" is no-defects or abnormal based on the difference image, and in the learning step, a processing parameter of the difference image generation engine or the difference image evaluation engine is learned based on the abnormality determination correct answer rate.

10. An abnormality determination method executed by an abnormality determination computer that determines an abnormality of an inspection target object, the abnormality determination method comprising: executing a no-defects learning image acquisition step of acquiring a no-defects learning image {f_i} (i=1, . . . , Nf, Nf: number of images) obtained by imaging the inspection target object of no-defects, a learning step of learning a parameter of an autoencoder using the no-defects learning image {f_i}, an inspection image acquisition step of acquiring an inspection image f obtained by imaging the inspection target object, a no-defects image estimation step of inputting the inspection image f" to the autoencoder to estimate an estimated no-defects image h", and a determination step of performing abnormality determination by a comparative inspection engine from the inspection image f" and the estimated no-defects image h", wherein in the learning step, a dimensional compression rate Rd of a code layer of the autoencoder is maximized, or an input signal amount to the code layer is reduced, or an output signal amount from the code layer is reduced, such that an abnormality determination correct answer rate Rc of the no-defects learning image {f_i} becomes maximum, or equal to or greater than a predetermined threshold th, with the abnormality determination correct answer rate Rc as an evaluation value.

11. The abnormality determination method according to claim 10, wherein maximization of the dimensional compression rate Rd of the code layer in the learning step is performed by reducing a number of nodes included in each channel of the code layer or a number of channels.

12. The abnormality determination method according to claim 10, wherein reduction of the input signal amount to the code layer in the learning step is performed by setting, among weights w_ij of a j-th input signal {x_ij} (i=1, . . . , Nn, Nn: number of nodes of code layer, j=1, . . . , Nx_i, Nx_i: number of input signals to i-th node of code layer) to an i-th node of the code layer, a value of a weight {w_ij|(i, j)∈Φ} (Φ: set of numbers (i, j) of weights w_ij for setting the value to zero) for at least one or more nodes to zero or a predetermined value below a threshold, and wherein the set Φ comprises pairs (i, j) identifying weights w_ij to be set to zero, where each pair (i, j) corresponds to an input signal x_ij that is equal to or less than a minimum value x_min when the no-defects learning image {f_i} is input to the autoencoder.

13. The abnormality determination method according to claim 10, wherein the comparative inspection engine includes a difference image generation engine that obtains a difference image between the inspection image f" and the estimated no-defects image h", and a difference image evaluation engine that determines whether the inspection image f" is no-defects or abnormal based on the difference image, and in the learning step, a processing parameter of the difference image generation engine or the difference image evaluation engine is learned based on the abnormality determination correct answer rate Rc.

14. The abnormality determination method according to claim 13, wherein the difference image generation engine obtains the difference image using a local perturbation difference method, and a processing parameter of the difference image generation engine includes at least a perturbation width.

15. The abnormality determination method according to claim 10, comprising an abnormality learning image acquisition step of acquiring an abnormality learning image {f'_i} (i=1, . . . , Nf, Nf: number of images), wherein in the learning step, a parameter of the autoencoder is learned using the no-defects learning image {f_i} and the abnormality learning image {f'_i}, and furthermore, in the learning step, with the abnormality determination correct answer rates Rc of the no-defects learning image {f_i} and the abnormality learning image {f'_i} as evaluation values, the dimensional compression rate Rd of the code layer having been encoded is maximized or the input signal amount to the code layer or the output signal amount from the code layer is reduced so that the abnormality determination correct answer rate Rc becomes maximized or equal to or greater than a predetermined threshold th.

16. The abnormality determination computer according to claim 1, wherein the dimensional compression rate Rd of the code layer is maximized while using the abnormality determination correct answer rate Rc as an evaluation value to determine when to stop reducing expressive power of the autoencoder, such that the autoencoder can restore only no-defects images and cannot restore abnormal images.

* * * * *